United States Patent
Seida et al.

(10) Patent No.: US 7,575,625 B2
(45) Date of Patent: Aug. 18, 2009

(54) METHOD FOR SEPARATING SOLIDS FROM GAS SCRUBBERS

(75) Inventors: Frank Seida, Werne (DE); Peter Graf, Gladbeck (DE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 373 days.

(21) Appl. No.: 11/226,196

(22) Filed: Sep. 15, 2005

(65) Prior Publication Data

US 2006/0112824 A1 Jun. 1, 2006

Related U.S. Application Data

(63) Continuation of application No. PCT/EP2004/013422, filed on Nov. 26, 2004.

(51) Int. Cl.
*B01D 47/00* (2006.01)
*B01D 53/50* (2006.01)
*C02F 1/52* (2006.01)

(52) U.S. Cl. ............................ 95/70; 95/195; 95/205; 95/235; 210/712; 210/732; 210/733

(58) Field of Classification Search .................. 95/57, 95/64, 70, 195, 205, 235; 210/702, 712, 210/729, 732, 738, 733; 423/242.1
See application file for complete search history.

(56) References Cited

U.S. PATENT DOCUMENTS

| | | | | |
|---|---|---|---|---|
| 3,788,469 A | * | 1/1974 | Hirsch et al. | 210/788 |
| 3,944,650 A | * | 3/1976 | Hirota et al. | 423/243.08 |
| 4,002,724 A | * | 1/1977 | McKie | 423/243.08 |
| 4,036,606 A | * | 7/1977 | Zimmermann et al. | 48/77 |
| 4,123,355 A | * | 10/1978 | Frosch et al. | 210/712 |
| 4,291,004 A | * | 9/1981 | McCaffrey et al. | 423/242.7 |
| 4,297,332 A | * | 10/1981 | Tatani et al. | 423/240 R |
| 4,317,806 A | * | 3/1982 | Leisegang | 423/244.04 |
| 4,702,844 A | * | 10/1987 | Flesher et al. | 210/733 |
| 5,362,458 A | * | 11/1994 | Saleem et al. | 423/243.06 |
| 5,624,649 A | * | 4/1997 | Gal | 423/243.11 |
| 7,037,434 B2 | * | 5/2006 | Myers et al. | 210/718 |

FOREIGN PATENT DOCUMENTS

| | | |
|---|---|---|
| DE | 38 08 374 A1 | 1/1989 |
| DE | 195 46 149 A1 | 6/1997 |
| DE | 196 36 243 A1 | 3/1998 |
| DE | 103 50 411 A1 | 6/2005 |
| GB | 1 456 551 | 11/1976 |
| WO | WO 87/05530 | 9/1987 |

\* cited by examiner

*Primary Examiner*—Frank M Lawrence
(74) *Attorney, Agent, or Firm*—Oblon, Spivak, McClelland, Maier & Neustadt, P.C.

(57) ABSTRACT

A solid is separated from a gas scrubber by collecting a solids burden not collected at a solids-collection device of a flue gas desulfurization system by adding at least one flocculant, flocculation aid or mixtures thereof, while using a separating device; wherein te flue-gas desulfurization system contains at least one absorption device disposed downstream from said solids-collection device.

8 Claims, 1 Drawing Sheet

METHOD FOR SEPARATING SOLIDS FROM GAS SCRUBBERS

BACKGROUND OF THE INVENTION

1. Field of the Invention

The present invention relates to a method for separating solids from gas scrubbers.

2. Description of the Related Art

Electrofilters are preferably used as dust collectors in industrial processes in which high off-gas temperatures and large off-gas streams occur, such as in large firing installations, cement furnaces and iron-ore sintering furnaces. Such electrofilters in principle operate in such a way that the released dusts or dust particles are charged in an electric field, the charged dust particles are attracted to a precipitating electrode, where they are then collected.

Power plants that burn fossil fuels to generate energy are subject to legal flue-gas desulfurization requirements. Numerous methods are known for flue-gas desulfurization. Examples worthy of mention here are the limestone-scrubbing method, which is a wet desulfurization method. Usually two-stage scrubber units with prescrubber and main scrubber are used for flue-gas desulfurization.

The first scrubber stage, known as the prescrubber, is operated in fluid having a strongly acid pH, in order to achieve separation of the elements of main group VII of the periodic table. For this purpose, the hot flue gases are cooled in the prescrubber and the acid constituents such as HF and HCl are separated, since fluorine and chlorine in the main scrubber cause serious impairment of the gypsum quality.

A droplet collector is interposed between the prescrubber and the main scrubber in order to prevent entrainment of droplets into the main scrubber and thus to prevent carryover of fluoride and chloride. Depending on fuel composition and electrofilter design, it may be that a specific proportion of the dusts released during combustion is not separated completely in the electrofilter but instead this dust fraction is ultimately washed out in the prescrubber of the flue-gas desulfurization system.

Several reasons can be cited for the increased carryover of ultrafine dust particles into the prescrubber:

- change of the usual fuel composition, for example if the sulfur concentration of the fuel composition becomes too low as a result,
- overloading of the electrofilter due to increase of the boiler power or to the larger flue-gas stream caused thereby,
- general loss of efficiency of the electrofilter, for example due to aging.

The washed-out dust burden, which accumulates in the form of sludge in the prescrubber, can cause numerous problems.

For example, the carried-over dust particles tend to encrust the plates of the droplet collector usually disposed between the prescrubber and main scrubber and to narrow the flue-gas passage. The direct consequence of this is an increase in the differential pressure $\Delta p$ across the droplet collector.

Incrustations formed in this way can cause considerable technical and commercial problems, from reduction of the output of the power-plant unit to shutdown of the power-plant unit.

For example, incrustations that have formed from the sludge phase of the prescrubber can lead to fouling of the droplet collector.

Such fouled droplet collectors then force the power-plant operator to reduce the output of the power plant, because the entire flue-gas quantity can no longer be passed through the flue-gas desulfurization system.

The traditional approach to solving this problem is to perform laborious cleaning operations on the droplet collector using a high-pressure water jet. In cases in which the incrustation is too heavy, however, the only and very costly alternative is to replace the droplet collector.

Cleaning of the droplet collector merely treats the symptoms of this problem, however, and does not represent a solution. And this is so, not only because this laborious and cost-intensive cleaning operation has to be performed periodically, but also because such use of high-pressure water jets for each cleaning operation leads to roughening of the material of the droplet collector. In turn, this increased roughness of the droplet collector favors renewed incrustation by the particles and thus increases the necessary cleaning frequency.

Thus, there exists a great need, as regards separating solids from gas scrubbers, for a method that does not suffer from the aforesaid disadvantages, that can be operated at low technical, commercial and labor costs and that, moreover, can be integrated into existing desulfurization systems.

SUMMARY OF THE INVENTION

It is an object of the present invention to provide a method for separation of solids from gas scrubbers, in which the ultrafine particles carried over despite the normally used solids or dust collectors are collected so extensively from the gas scrubber that no increase of the differential pressure $\Delta p$ can be observed at the gas scrubber.

This and other objects have been achieved by the present invention the first embodiment of which includes a method for separating a solid from a gas scrubber, comprising:

collecting a solids burden not collected at a solids-collection device of a flue gas desulfurization system by adding at least one flocculant, flocculation aid or mixtures thereof, while using a separating device;

wherein said flue-gas desulfurization system comprises at least one absorption device disposed downstream from said solids-collection device.

DETAILED DESCRIPTION OF THE INVENTION

Figure 1:
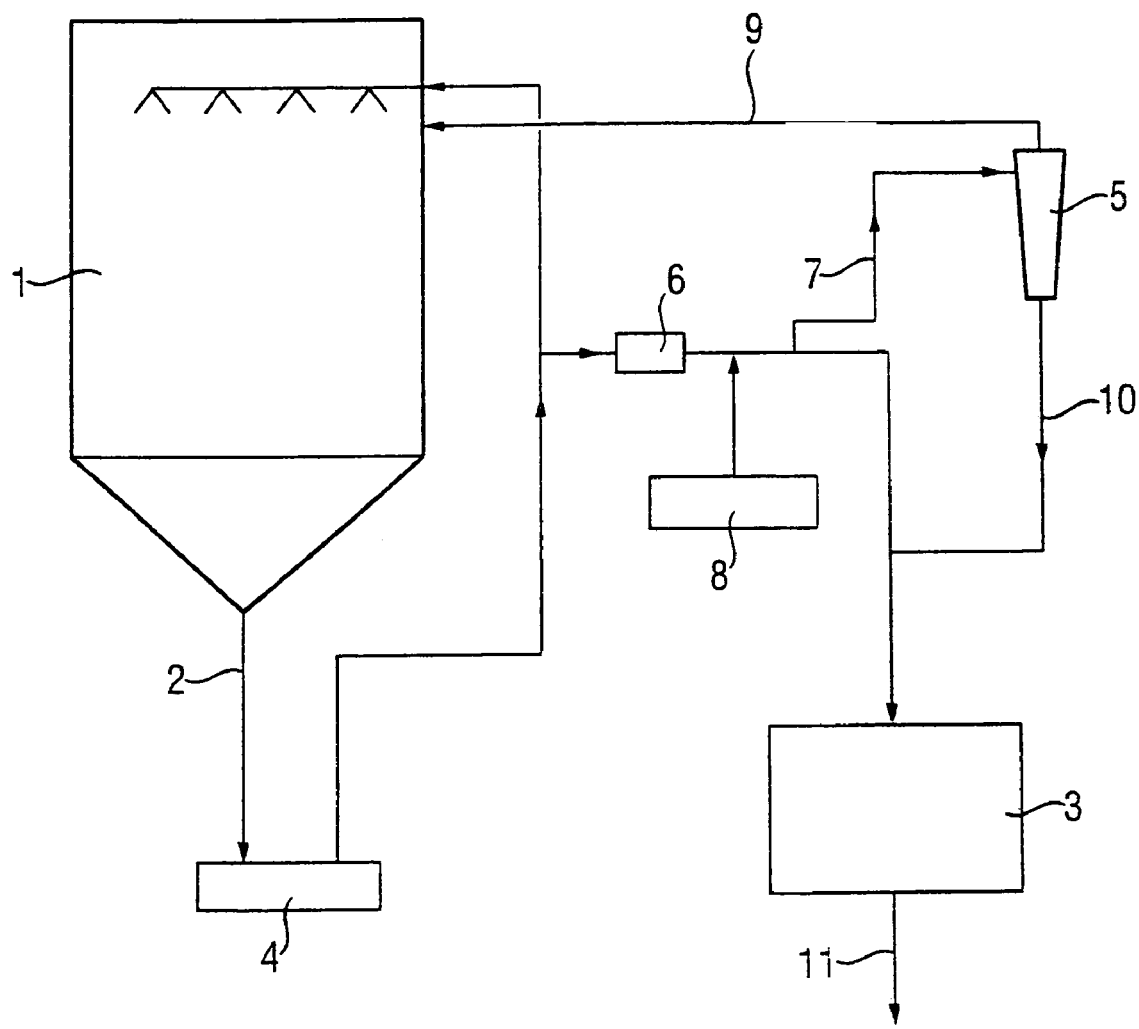
FIG. 1 shows a conventional flue-gas desulfurization prescrubber (1) and a prescrubber circuit associated therewith.

It has been surprisingly found that the above object can be achieved by a method for separating solids, especially in a flue-gas desulfurization system, that is provided with at least one absorption device disposed downstream from a solids-collection device, wherein the solids burden not collected at the solids-collection device is collected by addition of at least one flocculant and/or flocculation aid while using a separating device.

In the method of the present invention for separation of solids from gas scrubbers, at least one absorption device is used, preferably a sulfur dioxide absorption unit, especially for flue-gas cleaning. This device can comprise, for example, a prescrubber and a main scrubber. Particularly preferably, the absorption device is a standard flue-gas desulfurization prescrubber (abbreviated as FGD prescrubber).

This absorption device is disposed downstream from a solids-collection device. In other words, solids collection or dust collection takes place upstream from the absorption device. For the method according to the present invention, it is possible to use any solids-collection devices for solid/gas separation, for example from flue gases or other exhaust-air streams produced in technical processes. Examples are the cyclone, which is an inertial-force collector containing a settling and vortex-flow chamber, wet scrubbers or even filtering collectors. Preferably, electrofilters are used for solids separation in the method according to the present invention.

The method according to the present invention is explained with reference to FIG. 1 which shows a conventional FGD prescrubber (1) and a prescrubber circuit associated therewith.

This prescrubber circuit containing prescrubber (1) includes a pressure line (2), which leads to wastewater tank (3) of the flue-gas desulfurization system, as well as a circulation-pump device (4) of this prescrubber circuit (cooler pumps). According to the invention, there has been installed in this drain line a separating device (5), which is used for thickening the drained suspension and separating the entrained solids.

As an example, separating device (5) is integrated in the prescrubber circuit in such a way that a partial stream (7) is fed to separating device (5) via a regulating valve (6), which controls the outward transfer of a partial stream from prescrubber (1) to the FGD wastewater-treatment system. In this case, the flocculant is proportioned before entering the separating device, using a proportioning device (8) upstream from separating device (5), which according to the invention is particularly preferably a hydrocyclone.

After completion of phase separation, the fine fraction in the overflow of the separating device is separated as a clear phase (9) or is returned to FGD prescrubber (1), while the underflow of separating device (5) delivers the separated coarse fraction (10) to the wastewater system (11) that is normally connected.

Such separating devices such as cyclones are capable of separating solid particles or liquid droplets by means of centrifugal or inertial force. Cyclones for liquid systems are also known as hydrocyclones, and they have been used for many years in the prior art for thickening of suspensions and for separation of solids from sludge, for example in the field of gypsum suspension or in sink-float processes.

Important influencing variables for this separation operation in cyclones or hydrocyclones are the densities of the carrier fluid and solid. For example, a suspension from which solids are to be removed is fed into the inlet housing of the hydrocyclone. This tangential feed causes rotation of the suspension inside the hydrocyclone. Phase separation then takes place under the effect of centrifugal force, the fine fraction being separated as a clear phase in the hydrocyclone overflow or, as illustrated in FIG. 1, being returned to the FGD prescrubber, while the underflow of the cyclone is fed to the coarse fraction of the wastewater system that is normally connected.

In one embodiment, the use of separating devices or hydrocyclones alone in such a prescrubber circuit would not be capable of achieving the object according to the present invention.

The reason for this is that those dusts which are released during combustion of fuels and cannot be collected by means of dust collectors or dust filters, such as the normally used electrofilters, are minute fly-ash particles, 90% of which have diameters smaller than 5 µm. This means that the material suspended in the prescrubber is very finely dispersed, because almost 100% of the material has a particle size smaller than 20 µm. Because the mass is too small, solid-liquid separation by means of a hydrocyclone would therefore be infeasible as an industrial technique.

Surprisingly, it has been found that solid/liquid separation is possible using standard separating devices, preferably hydrocyclones, because particle agglomeration or flocculation is achieved when at least one flocculant is added to the separating device being used. By means of this particle agglomeration or flocculation, the particles/flocs become larger or the particle diameter/floc diameter increases.

In selecting the flocculant to be used, it must be realized that the coagulation or flocculation of the solid particles imposes very stringent requirements on the flocculant to be used, since the pH of the scrubber fluid has a value of around 0 during continuous operation and the flocs produced are subjected to extreme mechanical stresses and strains in the separating devices, especially in hydrocyclones. Furthermore, in order to minimize the investment costs for the installation and to minimize the process complexity, floc formation must take place spontaneously in the flow through the collection device if no mixing or conditioning vessels are provided in the system circuit.

According to the invention, all flocculants or flocculant combinations that bring about coagulation or agglomeration of the solid particles in a separating device can be used without restriction in order to achieve solid/liquid separation. Preferably, such flocculants are used that bring about growth of the particles or of the flocs to be separated to at least >15 µm and particularly preferably to at least >20 µm in the separating device being used, so that reliable solid/liquid separation is ensured therein and no increase of differential pressure $\Delta p$ can be observed in the gas scrubber, especially the prescrubber.

As described in the present invention, the term "flocculant and/or flocculation aid" includes all substances and/or agents that can influence the disperse particles in such a way that they aggregate to flocs and can be removed from the system. Flocculants according to the present invention are therefore all compounds or agents that are used for solid/liquid separation, such as in the clarification of liquids, in the thickening and dewatering of sludge, for example in the purification of industrial and communal wastewaters, the processing of potable water, the extraction of rock salt, bituminous coal, kaolin and ores by flotation, etc. and in many cases are also known by the terms flocculation aid or even sedimentation accelerator.

Preferably, non-ionogenic or anionic and particularly preferably cationic vinyl and/or acrylate polymers used as flocculants in wastewater treatment, in ore and coal processing and in paper manufacture can be used in the method according to the present invention. Particularly preferred are water-soluble cationic polyelectrolytes, which are used in large quantities worldwide in water-conditioning systems, especially for improving the flocculation and dewatering of the sewage sludges produced. The water-soluble cationic polyelectrolytes are usually composed of polymers of cationized acrylic acid derivatives such as cationic acrylic acid or methacrylic acid esters or copolymers of such esters with acrylamide, etc. Cationic flocculants are preferably used in the method according to the present invention.

Flocculants synthesized by the synthesis methods described in German Patent 10061483 A1 are particularly preferred flocculants. The water-in-water polymer dispersions described therein are incorporated by reference. Particularly advantageous for the method according to the present invention are the water-in-water polymer dispersions obtainable according to German Patent 10061483 A1 and synthesized and sold by Stockhausen GmbH & Co. KG of Krefeld under the trade name PRAESTOL® E 150.

It is particularly advantageous that the Praestol E 150® flocculant of Stockhausen can be integrated into the method without complex dissolution and proportioning systems, thereby reducing investments for dissolution and proportioning systems to a minimum and greatly increasing the operating reliability of the industrial installation.

Further flocculants that are also incorporated herein by reference are described in German Patents 4216167 A1, 4316200 A1, 4335567 A1 and 4401951 A1.

Furthermore, the procedure according to the present invention can be advantageously operated in the form of a continuous collection process, in order to remove the carried-over solids burden during operation of the prescrubber system.

This is achieved by filtration of a partial stream, thus greatly reducing the solids concentration in the prescrubber. Hereby greater thickening can be achieved in the prescrubber circuit and the wastewater volumes can be correspondingly minimized. For this purpose a partial stream is branched off from the feed line to the prescrubber scrubbing fluid and fed to the separating device, preferably a hydrocyclone. The hydrocyclone overflow, with greatly lowered solids concentration, is returned to the scrubber circuit as a clear phase. This procedure ensures thickening and a constant level in the prescrubber. The underflow of the hydrocyclone, containing concentrated solids, is fed in the traditional manner to the wastewater system. The conventional sludge removal from the prescrubber is closed, since the entire prescrubber balance is regulated via the separating device or the hydrocyclone system.

It is particularly advantageous in this continuous procedure that the solids burden in the absorption device, such as the prescrubber, can be kept at less than 2 g, preferably less than 1.5 g and particularly preferably less than 1 g of solids per liter of prescrubber fluid during the entire operating time. In fact, this very low solids concentration can be maintained under all operating conditions. The $\Delta p$ of the droplet collector does not suffer any increase in the chosen operating periods. Thus, incrustations on the droplet collector can be prevented or are precluded. By virtue of the greater thickening and the associated greater acid capacity, especially with regard to the HF concentration, redissolution of already formed incrustations is favored.

It is particularly preferable in the method according to the present invention to use the hydrocyclone as the separating device, because this separating unit satisfies the requirements imposed in practice, for example in a conventional flue-gas desulfurization system, since the collection efficiency can be adapted effectively to the current operating conditions via the volume flow being fed.

In practice, it can be observed that the resulting discharge flow, comprising the underflow of the hydrocyclone system, is much less voluminous than the conventional discharge flow.

For the above reasons, a drastic reduction of the hydraulic load on the wastewater system is achieved. Obviously the quantity of sludge to be treated remains identical to the conventional quantity.

The adjustment of the separation step and of the mass split as well as the design of the quantity to be circulated via the separating devices used, such as hydrocyclone systems, depend on numerous factors:

The quantity to be circulated defines the volume flow to be fed to the hydrocyclone. The design of the quantity to be circulated depends on the quantity of solids carried over into the prescrubber, on the existing structural conditions of the prescrubber and on the primary use of the power-plant unit.

The volume split indicates the ratio in which the feed flow to the hydrocyclone is divided into overflow and underflow. In principle, the volume split is defined by the overflow and lower-phase nozzles of the hydrocyclone.

The first step in practical design of a system in which the method according to the present invention can be used is to define the feed flow as a function of the quantity of solids carried over, for the purpose of designing the separating device to be used.

The solids-separation method according to the present invention, especially for flue-gas desulfurization systems equipped with the separating device being used, must be considered within the overall process of the system in which the solids-separation method will be used, because the wastewater is fed directly to the wastewater system, for example via the underflow of the hydrocyclone.

Because of the smaller volume flow and consequently the smaller wastewater quantity, a distinct reduction of the hydraulic load on the wastewater system can be observed. In regard to the residual moisture in the sludge and the purity of the filtrate, the dewatering behavior of the sludges produced, for example on a chamber filter press, is positively influenced by the dual flocculation. The mass balance of the collected solids is improved to the extent that the dry-substance content of the filtered sludge is increased.

A further advantage of the method according to the present invention is that external energy, which would have to be supplied by equipment such as pumps and auxiliary units, is not necessary. Complex individual or process control units are not required, since the system is self-regulating and automatically adapts to changing operating conditions.

Having generally described this invention, a further understanding can be obtained by reference to certain specific examples which are provided herein for purposes of illustration only, and are not intended to be limiting unless otherwise specified.

EXAMPLES

The method according to the present invention for collection of the solids burden was performed in one of the three flue-gas desulfirization systems of a power plant of the E.ON Power Plant Group. The flue-gas desulfurization systems used there operated according to the limestone-absorption method and were designed in two stages. Thus, they were equipped with a prescrubber and a main scrubber.

First, using a conventional process, the following was observed: Despite the dust filters used in the systems, high carryover of solids into the prescrubber occurred, because the dust concentrations measured downstream from the electrofilter were approximately 250 mg/m$^3$. The solids concentrations were usually between 3 and 6 g/l. After some time, the elevated solids concentration led to caking on the droplet collectors of the coolers and caused an increase in differential pressure $\Delta p$, with the result that the unit output declined after the differential pressure had increased to a certain level and the droplet collector had to be cleaned at the next scheduled power-plant shutdown.

This can be illustrated by means of the following sample calculation:

$$\text{Solids carryover} = \text{flue-gas quantity} \times \text{dust concentration downstream from collection by the electrofilter}$$

-continued $$= 300{,}000 \text{ m}^3/\text{h} \times \textit{approx. } 250 \text{ mg/m}^3$$

$$= \text{approximately 75 kg/h dust carryover into the prescrubber}$$

$$\text{Sludge removal} = 8 \text{ m}^3/\text{h} \times 5 \text{ g/l (solids content in the prescrubber)}$$

$$= 40 \text{ kg/h (discharge per hour)}$$

Then, the method according to the present invention was integrated into an existing flue-gas desulfurization system, and the system has been running continuously without problems since startup. A hydrocyclone system or multicyclone system of the Schauenberg Co. (Mühlheim a.d. Ruhr, Germany), which has proved to be reliable and robust both in the test phase and during continuous operation, was used as the separating device. See operating test 1.

The hydrocyclone was integrated into the pressure line of the prescrubber circuit in such a way that a partial stream of about 17 m³/h was transferred out downstream from a control valve and passed through a pressure line to a multicyclone station. A mixing section was inserted into this feed line, and this mixing section was used for proportioning the flocculant into the feed line of the hydrocyclone. Homogeneous distribution of the flocculant was achieved by addition of diluent water into the mixing section.

PRAESTOL® E 150 was used as flocculant, and was added by automatic proportioning pump. The quantity of proportioned flocculant was on the order of approximately 100 g/h, and approximately 350 l/h of diluent water was used for mixing.

The cooler fluid flow to the hydrocyclone was approximately 17 m³/h. The hydrocyclone was designed to achieve a volume separation of ⅓:⅔ parts. From the process engineering viewpoint, this meant that approximately 13 m³/h having a solids content of <1 g/l was recycled to the prescrubber via the cyclone overflow and approximately 4 m³/h having a solids content of approximately 19 g/l was transferred out to the wastewater system via the cyclone underflow. The sludge removal rate was approximately 75 kg/h (4 m³/h×approximately 19 g/l).

The method according to the present invention has been operated in a further power plant, again using a hydrocyclone as the separating unit, and the method has operated without problems ever since. See operating test 2.

Both of the described systems exhibit the same operating behavior. The solids burden in the prescrubber was successfully kept below 1 g of solids per liter of prescrubber fluid over the entire operating period. This very low solids concentration was successfully maintained under all operating conditions. The Δp of the droplet collector did not exhibit any increase during the operating period, and so incrustations on the droplet collector can be ruled out during operation of the method according to the present invention.

Other prescrubbers operated in the aforesaid power plants without the benefit of the procedure according to the present invention exhibited a distinct increase of the pressure difference Δp at the prescrubber during the comparison period, and so the usual cleaning operation had to be performed.

| OPERATING TEST 1 OF THE METHOD ACCORDING TO THE PRESENT INVENTION ||||||
|---|---|---|---|---|---|
| FGD 1 ||||||
| Initial conditions | | | 19:00 hours ||| 
| Sludge removal from cooler: | | | 7 m³/h |||
| Conductivity: | | | 58 mS/cm |||
| Solids: | | | 2.9 g/l |||
| Beginning of test | Conductivity mS/cm | Solids g/l | Sludge removal m³/h | Overflow m³/h | Underflow m³/h |
| 20:00 hours | 61 | 2.9 | 15 | 12 | 3 |
| 22:00 hours | 64 | 2.6 | 15 | 12 | 3 |
| 07:00 hours | 82 | 1.1 | 15 | 12 | 3 |
| 09:00 hours | 84 | 0.9 | 15 | 12 | 3 |
| 11:00 hours | 87 | 0.7 | 15 | 12 | 3 |
| 13:00 hours | 90 | 0.6 | 15 | 12 | 3 |
| 15:00 hours | 94 | 0.4 | 15 | 12 | 3 |
| Cyclone separation: | Quantity m³/h | Solids g/l | | | |
| Feed flow: | 15 | 2.9 | | | |
| Overflow: | 12 | 0.5 | returned to the prescrubber |||
| Underflow: | 3 | 13.5 | to the wastewater system |||

Result:

The wastewater flow was reduced from 7 to 3 m³/h. Stationary equilibrium in the prescrubber is attained at a solids concentration of 0.4 g/l. No negative effects were observed in the FGD wastewater system. Very good results were obtained both in the clarified-water discharge and in the behavior of the press.

Because of the smaller hydraulic load of the RAA, the sludge-sedimentation behavior is substantially more positive, and so it was possible to reduce the quantity of flocculation aid by about 20%.

| OPERATING TEST 2 ||||||
|---|---|---|---|---|---|
| FGD 1 Initial conditions ||||||
| Sludge removal from cooler: | | | 7 m³/h |||
| Conductivity: | | | 65 mS/cm |||
| Solids: | | | 3.1 g/l |||
| Beginning of test | Conductivity mS/cm | Solids g/l | Sludge removal m³/h | Overflow m³/h | Underflow m³/h |
| 08:00 hours | 65 | 3.1 | 11.5 | 9 | 2.5 |
| 09:00 hours | 67 | 2.7 | 11.5 | 9 | 2.5 |
| 10:00 hours | 68 | 1.55 | 11.5 | 9 | 2.5 |
| 11:00 hour | 69 | 1.5 | 11.5 | 9 | 2.5 |
| 12:00 hour | 71 | 1.4 | 11.5 | 9 | 2.5 |
| 13:00 hour | 72 | 1.2 | 11.5 | 9 | 2.5 |
| Cyclone separation: | Quantity m³/h | Solids g/l | | | |
| 09:00 Feed flow: | 11.5 | 2.7 | | | |
| Overflow: | 9 | 0.5 | returned to the prescrubber |||
| Underflow: | 2.5 | 12. | to the wastewater system |||

It is evident that a solids reduction of approximately 60% is already achieved in relatively short time (5 hours). The wastewater quantity is reduced by 65%.

German patent application DE 103 50 411, filed Oct. 28, 2003, and PCT/EP2004/013422, filed Nov. 26, 2004, are incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A method for separating a solid from a gas scrubber, comprising:
   collecting a solids burden not collected at a solids-collection device of a flue gas desulfurization system by adding at least one flocculant, flocculation aid or mixtures thereof, while using a separating device;
   wherein said flocculant, flocculation aid or mixtures thereof are a cationic acrylic acid or methacrylic acid ester or copolymer of such ester with acrylamide;
   wherein the addition of the flocculant, flocculation aid or mixtures thereof into the separating device results in agglomeration of the particles, the agglomerated particles having a particle and/or floc diameter of at least >15 µm;
   wherein said flue-gas desulfurization system comprises at least one absorption device, which is disposed downstream from said solids-collection device,
   wherein absorption device is a prescrubber of said flue-gas desulfurization system;
   wherein a proportioning device for proportioning the flocculant and/or flocculation aid is disposed upstream from the separating device; and
   said separating device is integrated in a prescrubber circuit; and
   wherein the solids burden in the absorption device is less than 2 g of solids per liter of scrubbing fluid.

2. The method according to claim 1 wherein an electrofilter is used as the solids-collection device.

3. The method according to claim 1 wherein a sulfur dioxide absorption system is used as the absorption device.

4. The method according to claim 1 wherein a hydrocyclone is used as the separating device.

5. The method according to claim 1 wherein solid/liquid separation is performed by addition of at least one flocculant, flocculation aid or mixtures thereof into the separating device.

6. The method according to claim 5 wherein a hydrocyclone is used as the separating device.

7. The method according to claim 1 wherein the flocculant, flocculation aid or mixtures thereof comprise a water-in-water polymer dispersion.

8. The method according to claim 1 comprising branching off a partial stream from the absorption device to the separating device, and,
   after solid/liquid separation has taken place in the separating device, separating said branched off partial stream as overflow and underflow,
   returning a fine fraction to the absorption system while feeding the coarse fraction in the underflow to a wastewater device.

* * * * *